United States Patent
Gunawan et al.

(10) Patent No.: US 11,835,333 B2
(45) Date of Patent: Dec. 5, 2023

(54) ROTATIONAL OSCILLATION SENSOR WITH A MULTIPLE DIPOLE LINE TRAP SYSTEM

(71) Applicant: INTERNATIONAL BUSINESS MACHINES CORPORATION, Armonk, NY (US)

(72) Inventors: Oki Gunawan, Westwood, NJ (US); Bruce Gordon Elmegreen, Goldens Bridge, NY (US); Deon Glajchen, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 17/644,817

(22) Filed: Dec. 17, 2021

(65) Prior Publication Data
US 2023/0194250 A1    Jun. 22, 2023

(51) Int. Cl.
G01B 11/26 (2006.01)
G01P 3/36 (2006.01)

(52) U.S. Cl.
CPC .............. G01B 11/26 (2013.01); G01P 3/36 (2013.01)

(58) Field of Classification Search
CPC ..... G21K 1/006; H01F 7/0268; H01F 7/0236; G01B 11/26; G01P 3/36
USPC ........................................................ 356/138
See application file for complete search history.

(56) References Cited

U.S. PATENT DOCUMENTS

| | | | |
|---|---|---|---|
| 3,493,275 A | 2/1970 | Stone | |
| 4,300,220 A | 11/1981 | Goff | |
| 4,792,931 A | 12/1988 | Nishida | |
| 5,365,671 A | 11/1994 | Yaniger | |
| 5,642,089 A * | 6/1997 | Lysen | H01F 7/0236 335/298 |
| 7,194,173 B2 | 3/2007 | Shtein | |
| 7,252,001 B2 | 8/2007 | Boletis | |
| 7,597,002 B2 | 10/2009 | Moser | |
| 7,859,157 B2 | 12/2010 | Baur | |
| 8,109,142 B2 | 2/2012 | Bratkovski | |
| 8,895,355 B2 | 11/2014 | Cao | |

(Continued)

FOREIGN PATENT DOCUMENTS

| | | |
|---|---|---|
| DE | 102010012970 A1 | 1/2014 |
| WO | 2012090134 A2 | 7/2012 |

OTHER PUBLICATIONS

Chen, Kou Cheng & Wang, Jeen-Hwa & Huang, Bor-Shouh & Liu, Chun-Chi & Huang, Win-Gee. (2013). Vibrations of the TAIPEI 101 Skyscraper Induced by Typhoon Fanapi in 2010. Terrestrial, Atmospheric and Oceanic Sciences. 24. 1. 10.3319/TAO.2012.09.17.01(T).

(Continued)

Primary Examiner — Isiaka O Akanbi
(74) Attorney, Agent, or Firm — Grant Johnson (57) ABSTRACT

Aspects of the present disclosure include a rotational oscillation sensor, a method of detecting rotational oscillation of an object, and a rotational oscillation sensor unit. One embodiment of the rotational oscillation sensor may comprise a first plurality of parallel dipole line (PDL) sensor unit units. In some embodiments, each of the plurality of PDL sensor units may comprise a plurality of cylindrical diametric magnets (CDMs) mounted in parallel around a first open region, and a diamagnetic object in the first open region.

19 Claims, 10 Drawing Sheets

(56) References Cited

U.S. PATENT DOCUMENTS

| | | | |
|---|---|---|---|
| 9,041,389 B2 | 5/2015 | Gokmen | |
| 9,093,377 B2 | 7/2015 | Cao | |
| 9,236,293 B2 | 1/2016 | Cao | |
| 9,263,669 B2 | 2/2016 | Cao | |
| 9,424,971 B2 | 8/2016 | Cao | |
| 9,978,493 B2 | 5/2018 | Gunawan | |
| 10,031,058 B2 | 7/2018 | Gunawan | |
| 10,082,408 B2 | 9/2018 | Gunawan | |
| 10,128,013 B1 | 11/2018 | Gunawan | |
| 10,197,640 B2 | 2/2019 | Gunawan | |
| 10,234,286 B2 | 3/2019 | Gunawan | |
| 10,352,797 B2 | 7/2019 | Gunawan | |
| 10,564,175 B2 | 2/2020 | Elmegreen | |
| 10,564,303 B2 | 2/2020 | Gunawan | |
| 10,613,249 B2 | 4/2020 | Gunawan | |
| 10,983,230 B2 | 4/2021 | Gunawan | |
| 11,175,305 B2 | 11/2021 | Elmegreen | |
| 2008/0143323 A1 | 6/2008 | Akahane | |
| 2014/0028306 A1* | 1/2014 | Gokmen | F04D 11/00 324/251 |
| 2017/0011876 A1* | 1/2017 | Natti | H01F 7/0268 |
| 2017/0045433 A1* | 2/2017 | Gunawan | G01N 27/00 |
| 2018/0031716 A1 | 2/2018 | Gunawan | |
| 2018/0095147 A1* | 4/2018 | Gunawan | G01R 33/12 |
| 2019/0140562 A1* | 5/2019 | Henderson | H01F 7/0236 |
| 2020/0150298 A1 | 5/2020 | Gunawan | |
| 2020/0286655 A1 | 9/2020 | Gunawan | |
| 2020/0326306 A1 | 10/2020 | Gunawan | |
| 2021/0025918 A1 | 1/2021 | Elmegreen | |
| 2021/0278556 A1 | 9/2021 | Elmegreen | |

OTHER PUBLICATIONS

Gunawan, Oki & Virgus, Yudistira & Tai, Kong Fai. (2015). A parallel dipole line system. Applied Physics Letters. 106. 062407. 10.1063/1.4907931.

Li et al.; "Development of a High-Sensitivity Optical Accelerometer for Low-Frequency Vibration Measurement", Sensors MDPI, Sensors 2018, 18, 2910; doi:10.3390/s18092910, pp. 1-15, <www.mdpi.com/journal/sensors>.

List of IBM Patents or Patent Applications Treated as Related.

Oki Gunawan and Yudistira Virgus, "The one-dimensional camelback potential in the parallel dipole line trap: Stability conditions and finite size effect", Journal of Applied Physics 121, 133902 (2017) https://doi.org/10.1063/1.4978876.

William H. K. Lee, Heiner Igel, Mihailo D. Trifunac; Recent Advances in Rotational Seismology. Seismological Research Letters 2009;; 80 (3): 479-490. doi: https://doi.org/10.1785/gssrl.80.3.479.

Merchant, B. John, "MEMS Applications in Seismology", Nov. 11, 2009, Seismic Instrumentation Technology Symposium, 31 pages.

The International Search Report and the Written Opinion of the International Searching Authority, International application No. PCT/EP2022/086053, Applicant's or agent's file reference, dated Mar. 21, 2023 (dated Mar. 21, 2023), 15 pages.

* cited by examiner

ROTATIONAL OSCILLATION SENSOR WITH A MULTIPLE DIPOLE LINE TRAP SYSTEM

BACKGROUND

The present disclosure relates to sensors, and more specifically, to sensors comprising a plurality of cylindrical diametric magnets (CDMs).

Cylindrical diametric magnets (CDMs) are a type of cylindrical magnet with magnetization along its diameter. The article by O. Gunawan, Y. Virgus, and K. Fai Tai entitled *A Parallel Dipole Line System* in Appl. Phys. Lett. 106, 062407 (2015) presents a study of a parallel linear distribution of dipole system, which can be realized using a pair of cylindrical diametric magnets.

SUMMARY

According to embodiments of the present disclosure, a rotational oscillation sensor comprising a first plurality of parallel dipole line (PDL) sensor unit units. In some embodiments, each of the plurality of PDL sensor units may comprise a plurality of cylindrical diametric magnets (CDMs) mounted in parallel around a first open region, and a diamagnetic object in the first open region. In some embodiments, the first plurality of PDL sensor units may be arranged in a first layer; and a second plurality of PDL sensor units may be arranged in a second layer.

According to embodiments of the present disclosure, a method of detecting rotational oscillation of an object, comprising deploying a first plurality of parallel dipole line (PDL) sensor unit units onto an object, and detecting a current position of each diamagnetic object relative to at least one of the plurality of cylindrical diametric magnets. In some embodiments, each of the first plurality of PDL sensor units may comprise a plurality of cylindrical diametric magnets mounted in parallel around a first open region, and a diamagnetic cylinder in the first open region.

According to embodiments of the present disclosure, a rotational oscillation sensor unit, comprising a metallic enclosure and a sensor module attached to the metallic enclosure. The sensor module may comprise at least three parallel dipole line (PDL) sensor unit units. Each of the PDL sensor units may comprise a plurality of cylindrical diametric magnets (CDMs) mounted in parallel around a first open region; and a diamagnetic object in the first open region. In some embodiments, the a rotational oscillation sensor unit may further comprise an electronics module coupled to the sensor module. The electronics module may be adapted to detect a current position of each diamagnetic object relative to at least one of the CDMs.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to sensors; more particular aspects relate to sensors comprising a plurality of cylindrical diametric magnets (CDMs). While the present disclosure is not necessarily limited to such applications, various aspects of the disclosure may be appreciated through a discussion of various examples using this context.

Many remote sensing applications may desire sensitivity to low angular rates of change, e.g., degrees per second, and/or low angular frequencies e.g., less than about 1 Hz. For example, in teleseismic monitoring applications, sensitivity to the low frequency components of earthquake oscillations may enhance detection range as the low frequency oscillations of earthquakes typically travel the greatest distances. Similarly, sensitivity to low frequencies may help in many structural monitoring applications, as the resonant motions of large buildings, bridges, and ships typically occur at low frequencies. Sensitivity to low speed/low frequency rotational oscillatory motion may be particularly significant for management and control of equipment and moving objects, and for sensing natural phenomena such as seismic activity and wind effects on large buildings, bridges and other structures. For example, the natural longitudinal frequency of TAIPEI 101, the second tallest building in the world, is 0.15 Hz and its rotation frequency is 0.24 Hz; this building has rotational seismometers with a resolution of $1.2 \times 10^{-7}$ rad/sec.

Accordingly, one embodiment of this disclosure is a rotational oscillation sensor comprising a plurality of parallel dipole line (PDL) magnetic trap systems. Some such embodiments may allow for high sensitivity measurements of low frequency harmonic rotation, which may be useful for applications, such as structural orientation sensing and seismic rotational oscillation measurements. Some embodiments may comprise a plurality of PDL magnetic trap systems that are positioned at spaced locations on one or two platforms. Each of the PDL magnetic trap systems in these embodiments may yield a time series displacement that is sensitive to very low frequency vibrations with a corner frequency of 1 Hz or lower. Some embodiments may even be sensitive at ultralow frequencies, down to 0.01 Hz. These embodiments may be particularly desirable for detecting slow periodic motions (e.g., motion with a low rate of change) and/or very low periodic rotation rates, such as the twisting and swaying of large buildings, the oscillations of large bridges or other large structures, and the motion of the earth in earthquakes.

Another embodiment of the disclosure is a rotational oscillation sensor comprising an ultrasensitive linear accelerometer. The linear accelerometer, in turn, may comprise a pair of CDMs aligned in parallel, in between which a cylindrical diamagnet (e.g., graphite) may levitate. Several such linear accelerometers may be placed in a rigid configuration, and may be fixedly mounted such that the system moves with the structure to-be-measured, such that the motion of the diamagnet relative to the CDMs may be measured to determine a three-dimensional rotational oscillation rate. One feature and advantage of these embodiments is that they are less bulky and less expensive compared to conventional rotational oscillation sensors, such as laser gyroscopic rings. Another feature and advantage of some embodiments is that they are comparatively simple and require less energy to operate. These features and advantages may allow these embodiments to be placed economically in many locations for better measurement of a distribution of rotations and/or motions with a low rate of change.

Figure 1:
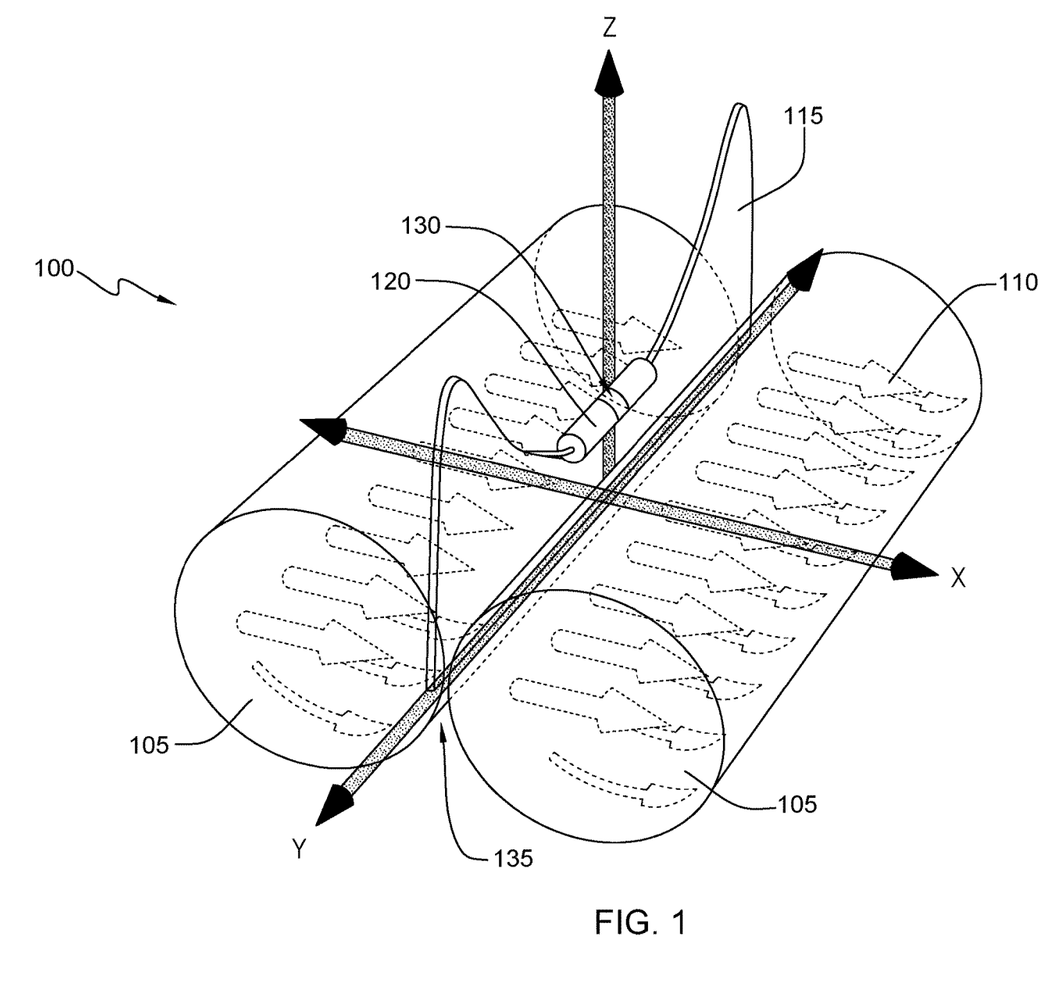
FIG. 1 is a perspective view of a system consisting of two CDMs aligned in parallel, consistent with some embodiments

FIG. 1 is a perspective view of a first embodiment of a PDL magnetic trap system 100. This embodiment may comprise two CDMs 105 fixedly mounted in parallel, with their respective magnetization orientations (i.e., arrows 110) oriented as depicted (i.e., parallel to the x axis). The CDMs 105 in such a configuration may cooperate to produce a camelback magnetic field profile 115 along the longitudinal axis y. A diamagnetic cylinder 120 may be trapped in the camelback-shaped magnetic potential in an open region 135 (e.g., a groove or gap) that is parallel to the CDMs 105. The diamagnetic cylinder 120 in FIG. 1 may comprise any material with relatively strong diamagnetic properties, such as pyrolytic carbon, bismuth, silver, or graphite. The CDMs 105, in turn, may comprise any material that can produce a strong permanent magnetic field. Suitable magnetic materials include neodymium alloys, such as NdFeB.

In operation, the diamagnetic cylinder 120 may be levitated and trapped by the camelback magnetic field 115 such that it tends to push the diamagnetic cylinder 120 toward the center position 130. That is, the diamagnetic cylinder 120 in FIG. 1 may be supported vertically against the force of gravity by the gradient of the magnetic field 115. The diamagnetic cylinder 120 may move freely (e.g., oscillate) from one end of the camelback-shaped magnetic potential to another in the open region 135.

The frequency of such oscillation may depend on the ratio between the length and the diameter of the CDMs 105. For larger ratio, the frequency will be lower. In some embodiments under vacuum conditions, the diamagnetic cylinder 120 may oscillate for many tens of thousands of cycles before it stops. This feature and advantage may be beneficially utilized to construct a sensor with a high quality or Q factor. Large Q factors, in turn, indicate low friction, and thus, a high sensitivity to a given input. That is, the PDL magnetic trap system 100 embodiment in FIG. 1 may be highly sensitive to mechanical perturbations at frequencies comparable to or higher than its natural oscillation frequency. For example, for a diamagnetic cylinder 120 of 25 mm long and diameter of 6.4 mm with magnetization M~$10^6$ A/m, the natural oscillation frequency of a levitating graphite is around 1 Hz. Sensitivity down to 0.1 Hz can be reached by a CDM 105 of ~100 mm long. Moreover, as will be explained in more detail below, some PDL trap systems 100 can measure signals even below these low natural frequencies because of their large Q factors (which lowers the range of sensitivity in frequency space).

Accordingly, one feature and advantage of some embodiments is that they may neither use nor require an attachment between the inertial mass and a housing. This feature and advantage may be desirable because the attachment(s) used by many prior art devices will restrict relative motion between the inertial mass and the housing, reducing their respective Q factors. Another feature and advantage of some embodiments is that they may contain and levitate the inertial mass (e.g., the diamagnetic cylinder 120) regardless of the orientation/rotation of the PDL magnetic trap system 100, thereby extending the versatility of the resulting sensors. Those skilled in the art will appreciate that this feature and advantage may be beneficial in environments and applications where the movement and/or orientation of the resulting sensor(s) cannot be limited to a single plane, such as inertial sensors used in certain transportation systems and/or aerospace applications. Some embodiments may further enhance containment of the inertial mass by adding a non-magnetic wall or window at the ends of the respective systems.

Figure 2:
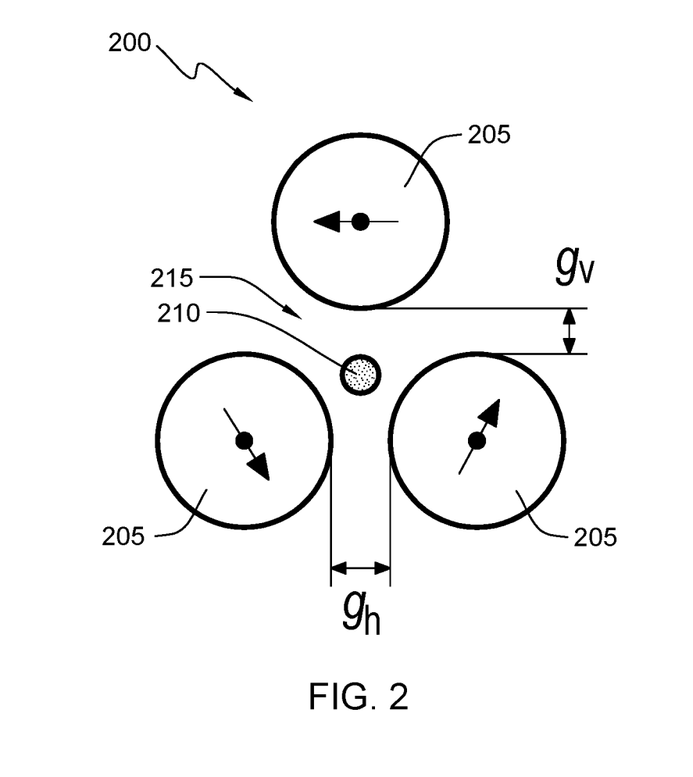
FIG. 2 is a cross-sectional view of a second PDL magnetic trap system, consistent with some embodiments.

FIG. 2 is a cross-sectional view of a second PDL magnetic trap system 200, consistent with some embodiments. This PDL magnetic trap system 200 may comprise three CDMs 205 held in parallel and in an equilateral triangle configuration by a rigid housing (not shown) with transverse magnetization angles as depicted. This PDL magnetic trap system 200 may further comprise a diamagnetic material 210, such as graphite cylinder, in an open region 215 between the CDMs 205. The resulting azimuthal magnetic configuration may exhibit an equilibrium state such that the CDMs 205 may relax and stick together within a fixture (not shown).

One feature and advantage of the PDL magnetic trap system 200 in FIG. 2 is that, for the right combination of magnet's magnetization, magnetic susceptibility, and system dimensions, the diamagnetic material 210 may levitate against the force of gravity in the central open region 215, and this levitation may be independent of the exact orientation of the three CDMs 205 relative to vertical as long as their respective cylindrical axes are approximately horizontal (e.g., so the diamagnetic material 210 does not fall out of the ends of the open region 215). That is, the diamagnetic material 210 may levitate in the open region 215 even if the system 200 is not exactly horizontal. Another feature and advantage of the PDL magnetic trap system 200 in FIG. 2 is that it may have two parameters that can be tuned such that the system exhibits a desired natural frequency: (i) a vertical gap ($g_v$) distance shown in FIG. 2, and (ii) a horizontal gap ($g_h$) distance shown in FIG. 2. In this embodiment, relatively higher natural frequency may be obtained when the horizontal gap is small and the vertical gap is large, and relatively lower natural frequency may be obtained when the horizontal gap is large and the vertical gap is small.

Figure 3:
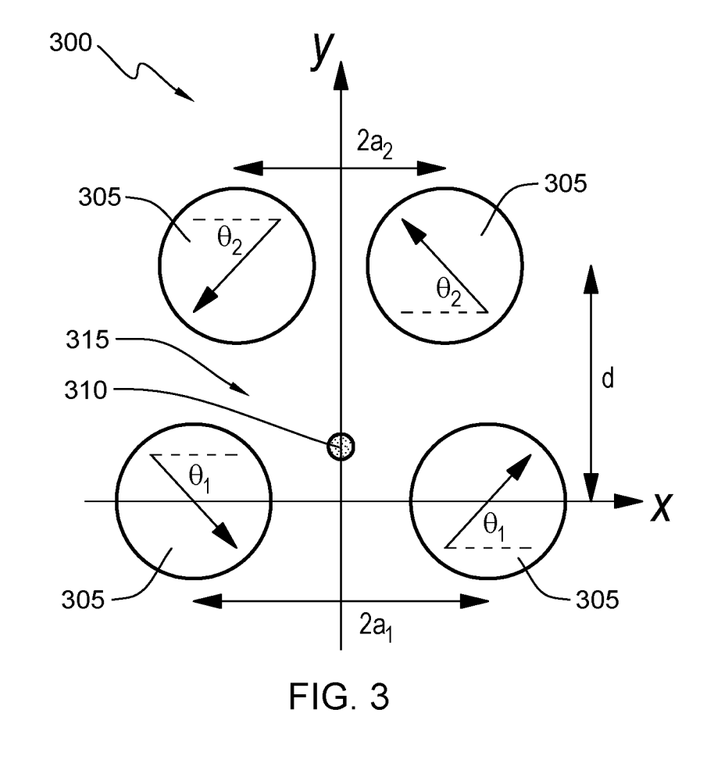
FIG. 3 is a cross-sectional view of a third PDL magnetic trap system, consistent with some embodiments.

FIG. 3 is a cross-sectional view of a third PDL magnetic trap system 300, consistent with some embodiments. The embodiment in FIG. 3 comprises four CDMs 305 held in parallel and in a trapezoid configuration by a rigid housing (not shown), and a diamagnetic cylinder 310 trapped in an open region 315 between the CDMs 305. As shown in FIG. 3, each CDM 305 in this embodiment may have its magnetization angle tilted with respect to the magnetization angle of the other CDMs 305 such that the system 300 forms a stable configuration, e.g., at approximately 60, 120, 240, and 300 degrees from the horizontal. These tilt angles can be calculated by considering the total potential energy (per unit length) of the system 300:

$$U_T = \frac{\mu_0 m_L^2}{2\pi} \left\{ \frac{-1}{4a_1^2} - \frac{1}{4a_2^2} + \frac{2\cos(\theta_1 - \theta_2 + 2\alpha)}{(d^2 + (a_1 - a_2)^2)} + \frac{2\cos(\theta_1 + \theta_2 + 2\beta)}{(d^2 + (a_1 + a_2)^2)} \right\},$$

where $a_1 = R + g_{h1}/2$, $a_2 = R + g_{h2}/2$ and $d = 2R + g_v$ with $g_{h1}$, $g_{h2}$ are the horizontal gap between the lower and upper two magnets respectively and $g_v$ is the vertical gap. This equation allows to determine the equilibrium tilt angles of the magnet's magnetization. The tilt angles that minimize the potential energy are $\theta_1 = \pi - \alpha - \beta$ and $\theta_2 = \alpha - \beta$ where based on geometry, $\tan \alpha = 2 \ d/(a_1 - a_2)$ and $\tan \beta = 2 \ d/(a_1 + a_2)$. The resulting magnetic field of the third PDL magnetic trap system 300 is the superposition of magnetic fields from the four CDMs 305.

One feature and advantage of third PDL magnetic trap system 300 is that there may be three adjustable gap parameters: (i) a lower horizontal gap $g_{h1}$; (ii) an upper horizontal gap $g_{h2}$; and (iii) and a vertical gap $g_v$. These gap parameters may be further tuned to achieve a very low natural oscillation frequency down to approximately 0.01 Hz. These gap parameters may also be tuned to achieve a desired spring constant of the camelback magnetic potential of the system 300. This spring constant, in turn, may affect how far the diamagnetic cylinder 310 moves in response to a given input, i.e., the sensitivity of the system 300 to motion.

The gaps and angles may also be tuned in some embodiments to trap the diamagnetic cylinder 310 such that it is equidistant from the two pairs of CDMs 305 in the x-direction (i.e., horizontal direction perpendicular to the cylinders of the CDMs 405) and slightly below center of the two pairs of upper and lower CDMs 305 in the y-direction. That is, for a symmetric configuration of system 300, the x-direction magnetizations of the upper CDMs 305 may be opposite to those of the lower CDMs 405. In the y-direction, however, the restoring force (or spring constant) of the system 300 may not be canceled out completely (i.e., such that the diamagnetic cylinder 310 is exactly in the center of the system 300).

Figure 4A:
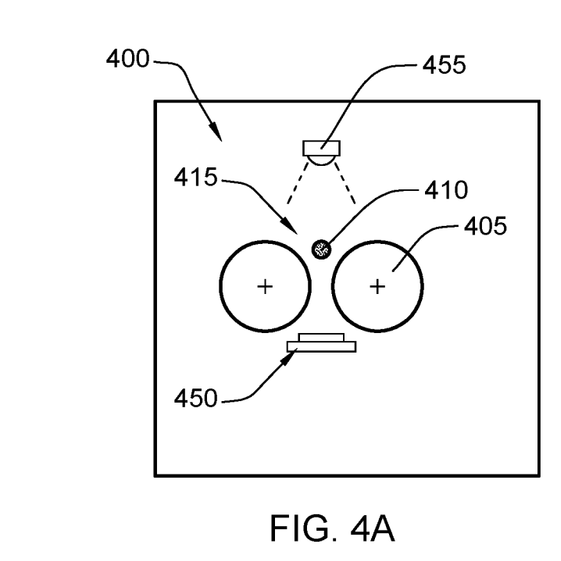
FIGS. 4A and 4B are cross sectional and side views of a PDL sensor unit suitable for use as a linear accelerometer, consistent with some embodiments.
Figure 4B:
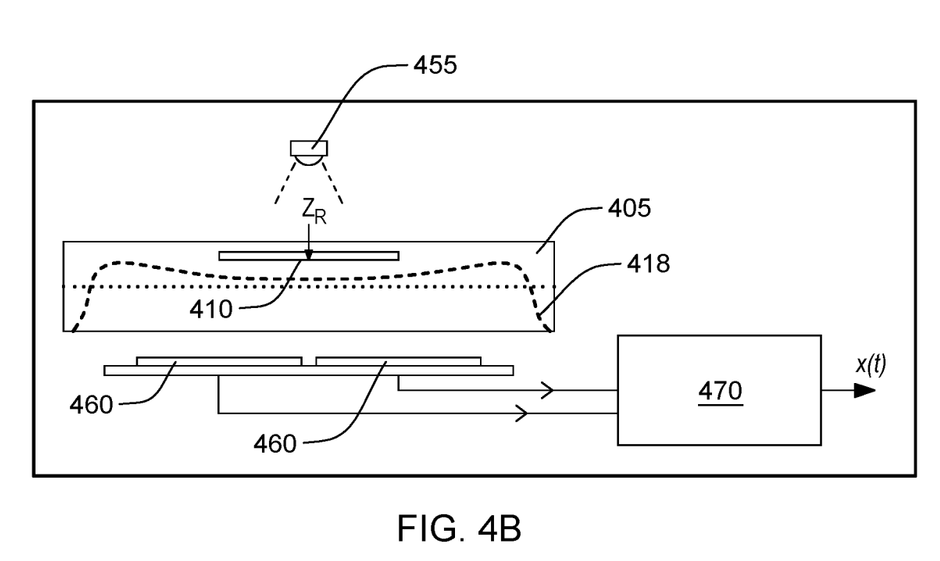

FIGS. 4A and 4B are cross sectional and side views of a PDL sensor unit 400 suitable for use as a linear accelerometer, consistent with some embodiments. This PDL sensor unit 400 may comprise of two CDM 405 that are magnetized perpendicular to their axes and attracted to each other so they stick firmly within a fixture (such as that described with reference to FIGS. 12A and 12B).

In operation, a diamagnetic object 410 resting in a groove 415 between the CDM 405 may be supported entirely by the magnetic field from the CDMs 405 if the magnets and the diamagnetism are suitably strong. An example of a suitably strong material for the CDMs 405 are neodymium alloys, such as NdFeB. Suitably strong diamagnetic materials for the diamagnetic object 410 include pyrolytic carbon, bismuth, silver and graphite. In one illustrative example, a graphite diamagnetic cylinder 410 will levitate between two neodymium CDMs 405.

The CDMs 405 in FIG. 4 may cooperate to produce a camelback-shaped magnetic field 418 profile along the longitudinal axis (z). The diamagnet object 410 in some embodiments may resist motion perpendicular to the CDMs 405, and may be trapped parallel to the CDMs 405 in the groove 515 between them, due to forces exerted by the camelback-shaped magnetic field 418. Along the remaining axis, the diamagnet object 410 may oscillate from one end of the camelback field 418 to another. The frequency of oscillation depends on the ratio of the length and the diameter of the CDMs 405. For larger aspect ratio, the frequency is lower. For a typical CDM length of 25 mm to 100 mm and diameter 6.4 mm and magnetization of NdFeB magnet M~$10^6$ A/m, the oscillation frequency of the graphite may be between 0.1 Hz and 1 Hz.

In operation, the diamagnetic object 410 may be displaced from its equilibrium state relative to the surrounding CDMs 405 if the CDMs 405 are moved (i.e., the inertia of the diamagnet object 510 causes it to resist movement in an absolute sense). A measurement of the displacement of the diamagnetic object 410 relative to the CDMs 405 is, thus, also a measurement of the absolute acceleration of the CDMs 405 themselves. During rotational oscillation motions of the rotational sensors described in detail below, a plurality of PDL sensor units 400 may be accelerated at slightly different rates. The direction of the axis of rotation and the rotation rate may be determined from the differences between these simultaneous accelerations.

FIG. 4 also includes one embodiment of a vibration (displacement or acceleration) detection system 450. This embodiment is a passive detection type system, which means the trapped diamagnetic object may oscillate naturally. This detection system 450 may comprise a light source 455 located above the diamagnetic object 410 and a split photodetector 460 located below the diamagnetic object. The light source 455 may be a small light emitting diode (LED) that provides constant illumination. Each half of the split photodetector 460 may measure a current illumination level received from the light source 455. A position of the diamagnetic object 410 may be inferred from the differential measurement of the two halves of the split photodetector 460. The detection system 450 in FIG. 4 may also use a differential amplifier 470 to convert the difference in the signals from the split photodetector 460 into a voltage signal that is proportional to the current position of the diamagnetic object 410.

Figure 5A:
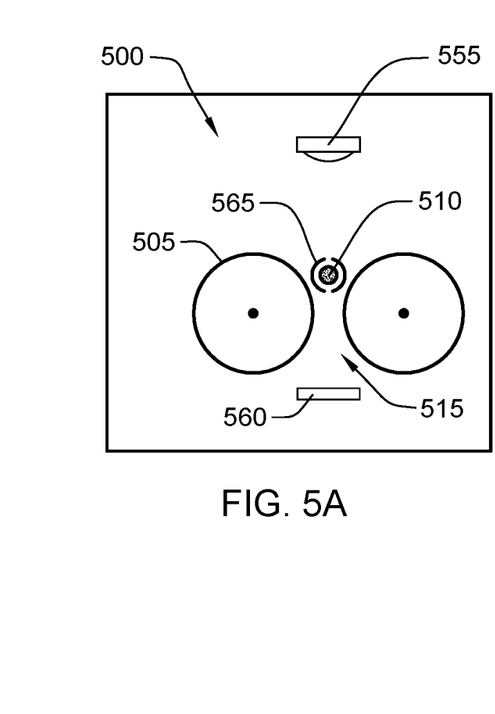
FIGS. 5A-5B are cross-sectional and side views of a second PDL sensor unit suitable for use as a linear accelerometer, consistent with some embodiments.
Figure 5B:
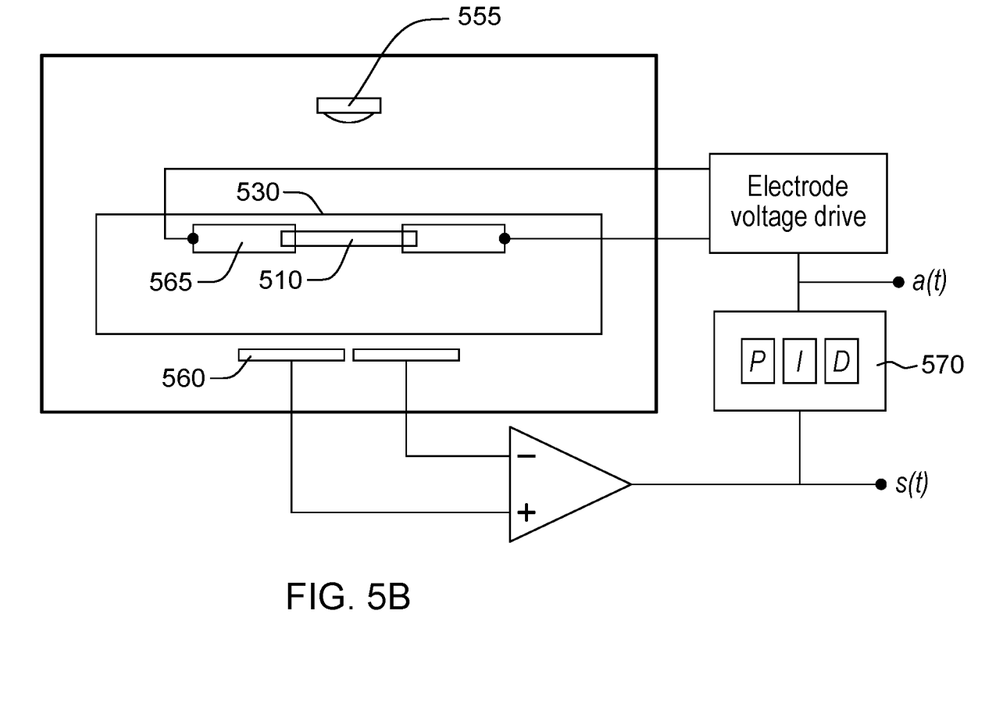

FIGS. 5A-5B are cross-sectional and side views of a second PDL sensor unit 500 suitable for use as a linear accelerometer, consistent with some embodiments. This second type of detection system 550 is an active detection type. Its basic configuration is similar to the passive system described with reference to FIGS. 4A and 4B, with two CDM 505, a diamagnet object 510 (e.g., graphite), and a vibration (displacement or acceleration) detection system 550. The vibration detection system 550, in turn, may comprise a light source 555 and a split photodetector 560.

The embodiment in FIGS. 5A and 5B may further have two curved (e.g., half cylindrical) electrodes 565 that partially surround the ends of the diamagnetic object 510. These electrodes 565 may be electrically energized by a voltage driver to actively bias the diamagnetic object 510 toward a center position 530 via electrostatic actuation. For example, if the left electrode 565 is energized with certain voltage, the diamagnetic object 510 may be pulled to the left, whereas if the right electrode 565 is energized, the diamagnetic object 510 may be pulled to the right. A negative feedback system employing a proportional, differential, and integral (PID) controller 570 may be beneficially used so that the trapped diamagnetic object 510 is always biased toward the center 530 of the PDL sensor unit 500. In this way, the voltage applied to the electrodes 565 by an electrode voltage drive (and/or the PID controller's output) in these embodiments may be proportional to the ground acceleration to be sensed.

FIGS. 6-11 describe several example embodiments of a rotational oscillation sensor comprising one of a plurality of the PDL sensor unit 400, 500 described with reference to FIGS. 4-5. In these example embodiments, the primary measurement is the displacement of the diamagnetic material 410, 510 relative to the CDMs 405, 505. However, as discussed below, velocity or acceleration measurements may also be used in each embodiment. Illustrative systems and methods to obtain these measurements are also discussed below. The individual measurements may then be combined to give the rotational oscillation motion using one or more of the equations below:

$$\begin{pmatrix} \omega_x \\ \omega_y \\ \omega_z \end{pmatrix} = \frac{1}{2} \nabla \times v = \frac{1}{2} \begin{pmatrix} \partial_y v_z - \partial_z v_y \\ \partial_z v_x - \partial_x v_z \\ \partial_x v_y - \partial_y v_x \end{pmatrix} \qquad \text{Equation 1}$$

Figure 6:
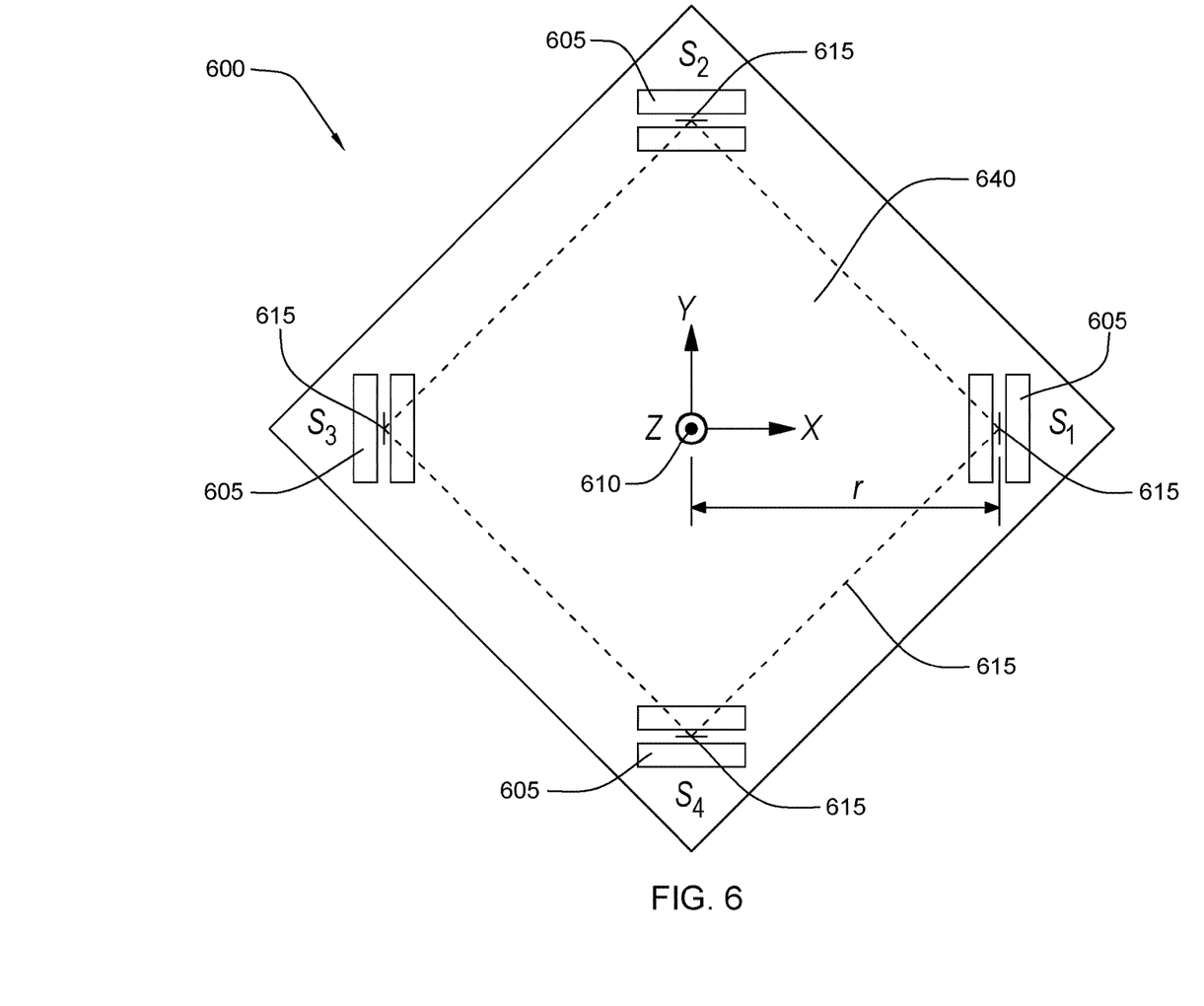
FIG. 6 is top view of a first one-axis (vertical) rotational oscillation sensor, consistent with some embodiments.

More specifically, FIG. 6 is top view of a first one-axis (vertical) rotational oscillation sensor 600, consistent with some embodiments. This rotational oscillation sensor 600 may comprise four PDL sensor units $S_1$ to $S_4$ 605 (which, in turn, may each comprise a PDL magnetic trap system 100, 200, or 300) that may cooperate to detect periodic motion around an axis of rotation, e.g., the vertical rotation axis "z". The PDL sensor units 605 may be fixedly attached to a generally planar base 640 such that they are approximately horizontal relative to the earth's gravity. The PDL sensor units 605 may be further fixedly attached at the corners of a square or rectangle 620, oriented approximately in an azimuthal direction relative to the measured axis ("z" as depicted). The centers 615 of each PDL sensor unit 605 may be located at distance "r" from a center 610 of the rotational oscillation sensor 600. By measuring the differences in displacement of the PDL sensor units 605, x and y (and, therefore, velocities $\dot{x}$ and $\dot{y}$) in all four corners, the vertical angular velocity or rotational oscillation of the platform around the z axis can be obtained using either equation 2 or equation 3 below:

$$\omega_z = (\partial_x v_y - \partial_y v_x)/2 \qquad \text{Equation 2:}$$

$$\omega_z = (\dot{y}_1 - \dot{y}_3 - \dot{x}_2 + \dot{x}_4)/4r \qquad \text{Equation 3:}$$

where $\dot{y}_1$ and $\dot{y}_3$ are the velocity (only in y axis) for sensor $S_1$ and $S_3$ respectively, $\dot{x}_2$ and $\dot{x}_4$ are the velocity (only in x axis) for sensor $S_2$ and $S_4$ respectively and r is a distance between the center of the sensor and the center of the platform 610.

Figure 7:
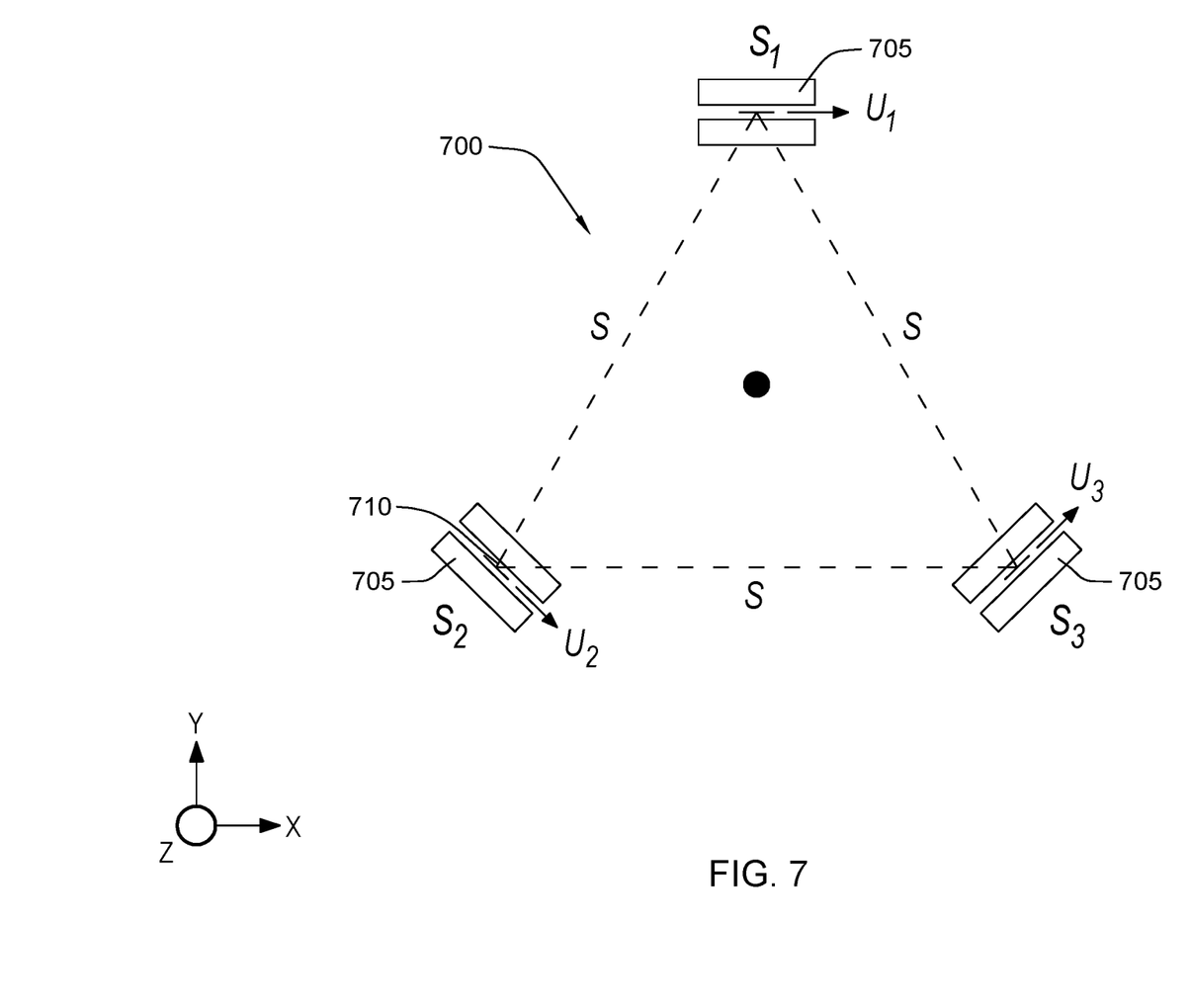
FIG. 7 is top view of a second one-axis (vertical) rotational oscillation sensor, consistent with some embodiments.

FIG. 7 is top view of a second one-axis (vertical) rotation acceleration sensor 700, consistent with some embodiments. This rotation acceleration sensor 700 embodiment may comprise three PDL sensor units 705 placed on the vertices of an equilateral triangle with an orientation such that the motion of the diamagnetic material with respect to the enclosing magnets is tangential to the rotation direction. The centers 710 (only some labeled for clarity) of the three PDL sensor units 705 may be located at distance s from each other. As with the embodiment in FIG. 6, by measuring the displacement $u_n$ of each PDL sensor unit $S_n$ 705, the vertical angular velocity of the platform around the z axis may be obtained. The calculation of angular velocity is similar like previous case, using Eq. 2, which can be simplified into:

$$\omega_z = \frac{\sqrt{3}(\dot{u}_2 + \dot{u}_3 - \dot{u}_1)}{3s} \qquad \text{Equation 4}$$

One feature and advantage of this embodiment is that it uses fewer sensors and thus allows a more compact system. Alternatively, some embodiments may measure and average all three PDL sensor units 705 to reduce measurement noise.

FIGS. 8-11 illustrate several different embodiments of a rotational oscillation sensor. In these embodiments, one component of the rotation (e.g., around the z axis) may be determined using the methods described with reference to FIGS. 6-7. The other components of the rotation vector (e.g., in around x and y axis) may utilize vertical velocities and derivatives of horizontal velocities in the vertical direction. The components of rotation in the three directions may be determined using equations 5-7 below:

$$\omega_x = (dv_y/dz - dv_z/dy)/2$$

$$\omega_y = (dv_z/dx - dv_x/dz)/2$$

$$\omega_z = (dv_x/dy - dv_y/dx)/2 \qquad \text{Equations 5-7:}$$

As in the embodiments described with reference to FIGS. 6-7, the derivatives in equations 5-7 may be replaced by differences for both velocities and position, with additional redundancy because there are many possible pairs of velocities and positions for each term. For example, the derivative $dv_y/dz$ may be evaluated using differences between any PDL trap in the lower layer and any PDL trap in the upper layer. Moreover, all of these evaluations can be averaged together to increase accuracy.

Figure 8:
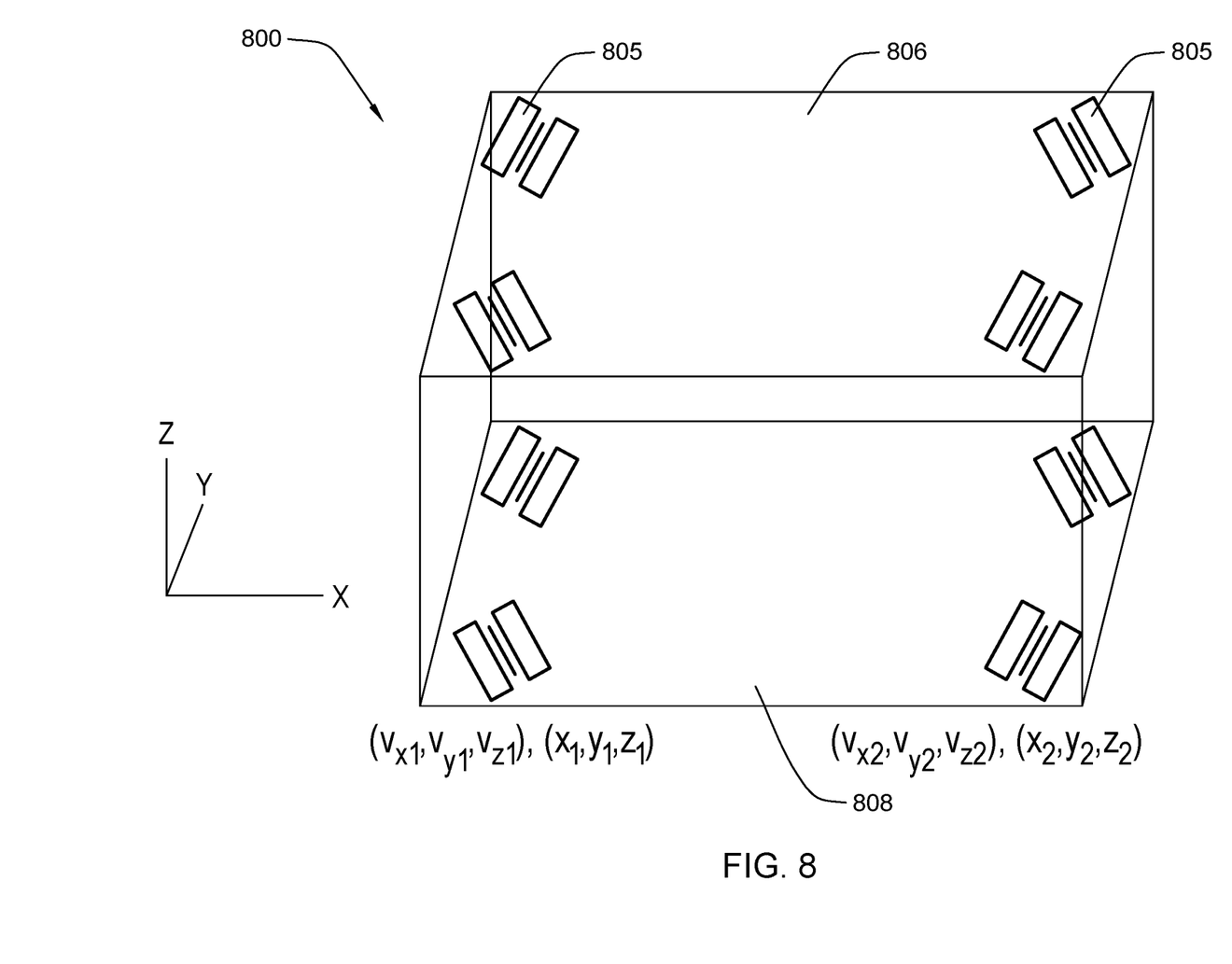
FIG. 8 is top view of a first three-axis rotational oscillation sensor, consistent with some embodiments.

More specifically, FIG. 8 is top view of a first three-axis rotational oscillation sensor 800, consistent with some embodiments. This rotational oscillation sensor 800 may comprise eight PDL sensors units 805, organized into a top layer 806 and a bottom layer 808. For measuring rotational oscillation around a single e.g., vertical axis, the function is as described with reference to FIGS. 6 and 7. For rotational oscillation around the horizontal axis, the top layer 806 and bottom layer 808 may accelerate at different rates. This difference, in turn, may be measured using differences in the horizontal displacements of the diamagnetic cylinders relative to the CDMs in which they are resting. For an instantaneous rotation rate ("Ω"), the centrifugal acceleration may be the product of $Ω^2$ and a distance to the relevant axis of rotation. For example, for a horizontal component of the rotation axis, the top and bottom layers may have a different distance to the rotation axis, and thus, different centrifugal accelerations. These different accelerations, in turn, may create different vertical displacement of the diamagnetic material(s) in the CDMs. For an angular acceleration (e.g., when Ω changes with time as from an oscillation around a horizontal axis), the horizontal acceleration in each layer 806, 808 may increase linearly with the distance from the PDL sensors units 805 to the axis of rotation. Then, the horizontal acceleration (as measured by parallel displacements of the diamagnetic material from the camel-back shaped potential of the PDL sensor unit 805) will be different in the top layer 806 and the bottom layer 808. All horizontal rotation axes may be sensed with the PDL sensors units 805 on the corners of each layer 806, 808.

Figure 9:
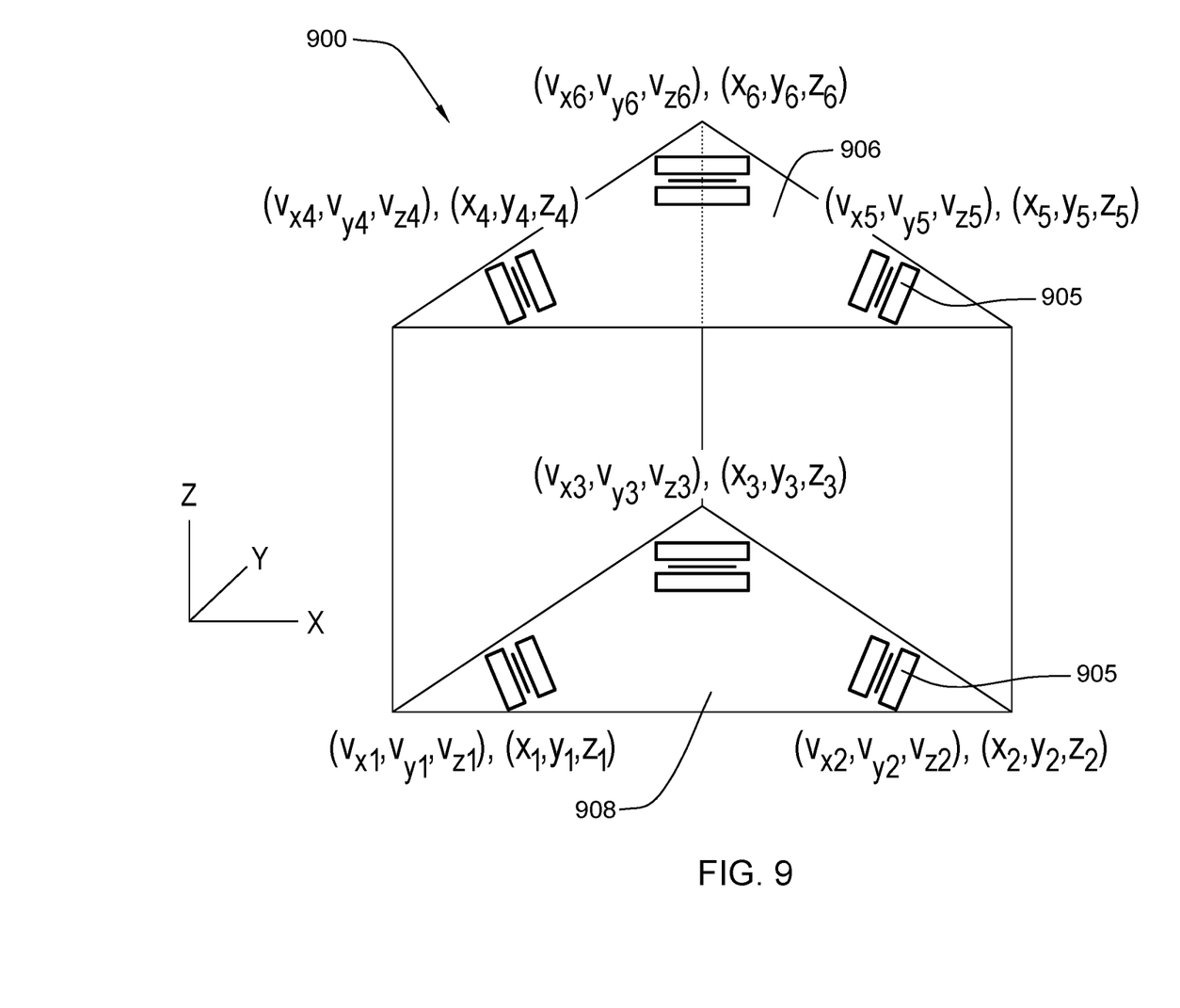
FIG. 9 is perspective view of a second three-axis rotational oscillation sensor, consistent with some embodiments.

FIG. 9 is perspective view of a second three-axis rotational oscillation sensor 900, consistent with some embodiments. This rotational oscillation sensor 900 comprises six PDL sensor units 905, three on each of two horizontal planes 906, 908. Like the four-corner arrangement 800 in FIG. 8, this three-corner arrangement may detect rotational motions and rotational accelerations for all directions of the rotation axes (e.g., about the x, y, and z axis), but is simpler (e.g., fewer PDL sensors units). Additionally, for single axis measurement, the rotational oscillation sensor 900 may have more redundancy in the measurement than the embodiments in FIGS. 6-7.

Figure 10:
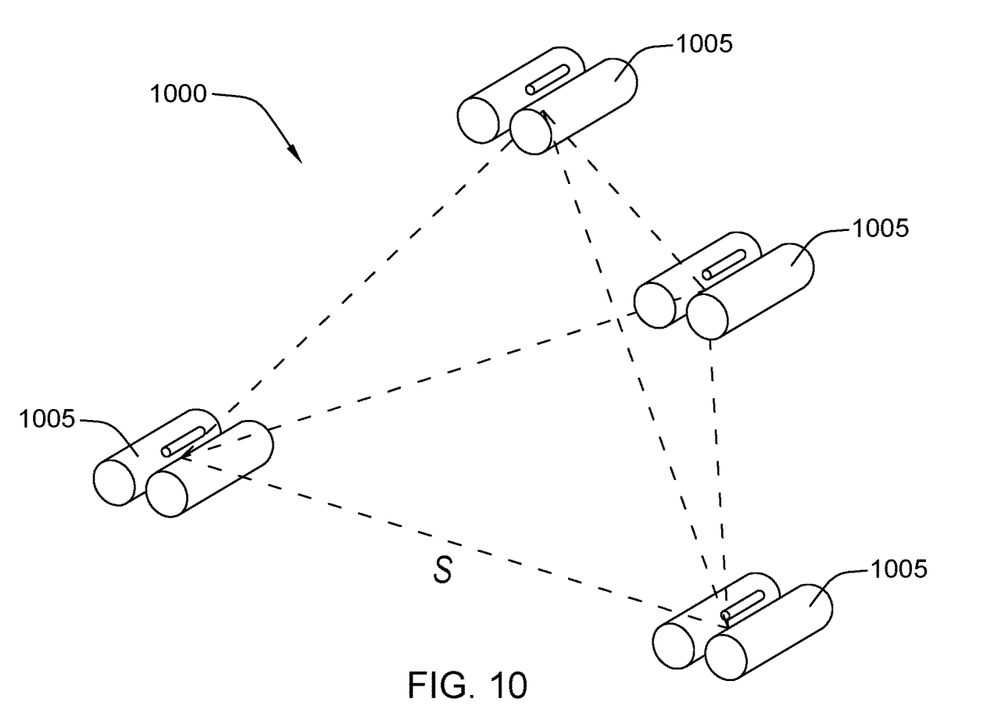
FIG. 10 is a perspective view of a third three-axis rotational oscillation sensor, consistent with some embodiments.
Figure 11:
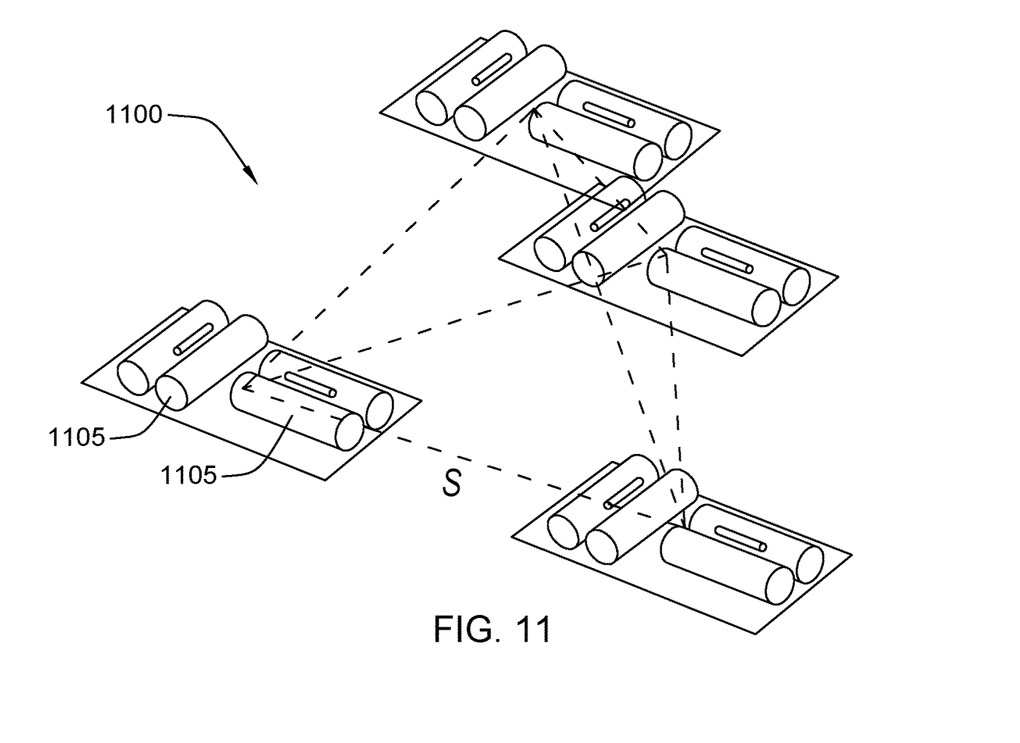
FIG. 11 is a perspective view of a fourth three-axis rotational oscillation sensor, consistent with some embodiments.

FIG. 10 is a perspective view of a third three-axis rotational oscillation sensor 1000, consistent with some embodiments. This rotational oscillation sensor 1000 comprises four PDL sensor units 1005 in a tetrahedron configuration. This embodiment may also include a fifth PDL sensor unit 1005 (not shown) such that they form a pentahedron. FIG. 11 is a perspective view of a fourth three-axis rotational oscillation sensor 1100, consistent with some embodiments. This rotational oscillation sensor 1100 is similar to the third sensor 1000 embodiment, but with pairs of PDL sensor units 1105 (only some labeled for clarity) at each corner of the tetrahedron. The pairs of PDL sensor units 1105 may, in turn, be stacked perpendicularly next to each other. This rotational oscillation sensor embodiment 1100 may also be supplemented with a fifth pair of PDL sensor units 1105 to form a double pentahedron.

Figure 12A:
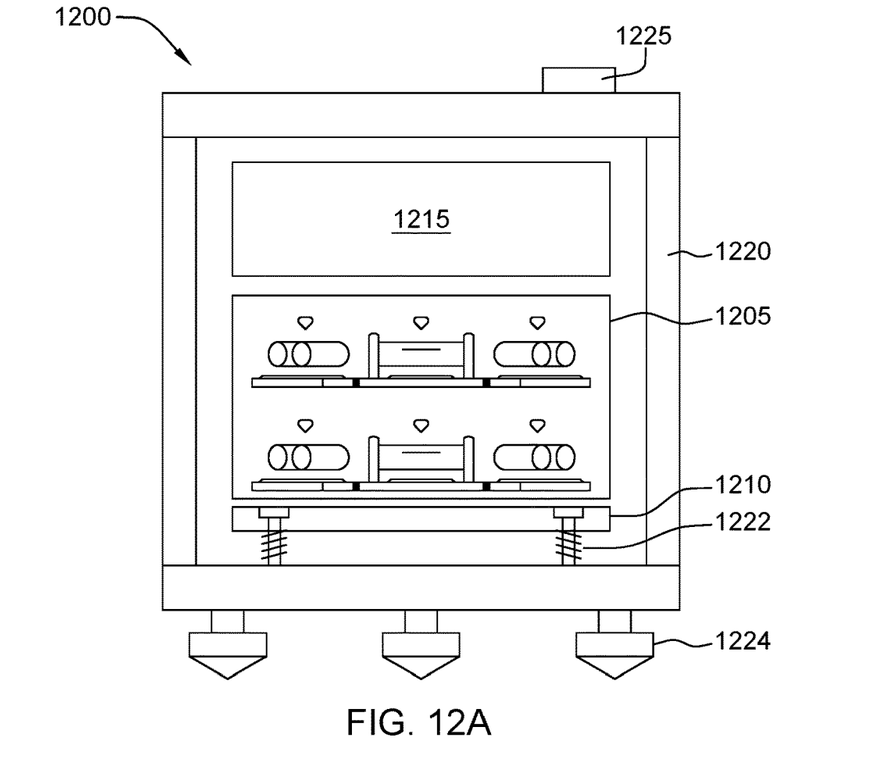
FIGS. 12A-12B are side and cross-sectional views of a complete sensor unit, consistent with some embodiments.
Figure 12B:
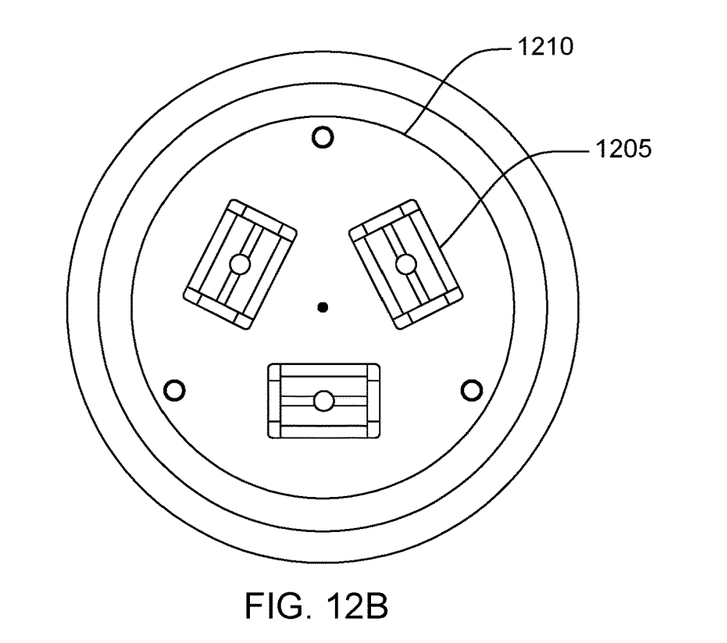

FIGS. 12A-12B are side and cross-sectional views of a complete sensor unit 1200, consistent with some embodiments. The complete unit 1200 may comprise a sensor module 1205 (which may comprise a plurality of PDL sensor units) sitting on an adjustable base platform 1210, an electronics module 1215, and an enclosure 1220 made of metal for electrical noise suppression. The unit is 1200 may be electrically connected to a digitizer (not shown) via an electrical socket 1225 that will record the rotation signals and stream it to a database server. The enclosure 1220, in turn, may comprise an internal level adjust 1222 and level adjust feet 1224.

As discussed above, rotational speed and acceleration during oscillatory motions may be detected by the embodiments described herein by measuring the differences between horizontal displacements of the PDL sensor units. Rotational oscillations around the vertical axis may be measured using displacement differences between PDL sensor units on the same horizontal level, and rotational oscillations around the horizontal axis may be measured using displacement differences between PDL sensor units in the lower and upper levels. In both cases, the displacement differences may be larger if the separation between the PDL sensor units is larger.

The sensitivity of the embodiments in FIGS. 6-11 may be determined as follows. Suppose the natural frequency of the diamagnetic material for oscillation in the magnetic potential well of the PDL trap is $\Omega_{PDL}$. Then, the horizontal displacement of the diamagnetic material from the center of the potential well may be $a/\Omega_{PDL}^2$ for acceleration a in the direction parallel to the magnets. The acceleration a of the diamagnetic material parallel to the CDMs, measured relative to another PDL sensor in the gyroscope, may be the product of the square of the component of the angular rotation rate $\Omega_{gyr}$ of the gyroscope in the direction perpendicular to the magnets in the first sensor multiplied by the distance between the two sensors, L, i.e., $a=\Omega_{gyr}^2 L$. Thus, the displacement of the diamagnetic material from equilibrium in the PDL trip may be $(\Omega_{gyr}/\Omega_{PDL})^2 L$. This displacement may be the measured quantity. As can be seen, it relatively large, and so, low frequency rotations are more easily measured, if the size of the gyroscope, L, is larger. Rotational oscillations are also more easily measured if the natural frequency of the PDL trap is small, corresponding to a long oscillation period around equilibrium.

Accordingly, one feature and advantage of some embodiments is that the displacement measurements systems discussed herein, e.g., the split photodetector discussed with reference to FIG. 6 or the split capacitor system discussed with reference to FIG. 7, may measure the position of the diamagnetic material to 10's of microns, which is a distance smaller than system size by a factor of $10^4$ for an L=10 cm gyroscope size. Thus, the embodiments described herein can measure rotational oscillation rates one hundred times lower than the natural frequency of each PDL trap. For individual PDL traps several centimeters in length, the natural oscillation frequency is between 0.1 and 1 Hertz, so some rotational oscillation sensor embodiments can measure environmental rotations with frequencies down to 0.001 Hz, with lower frequencies possible for larger gyroscopes, L, decreasing as the inverse square root of L.

While aspects of the present disclosure has been described with reference to a number of specific embodiments, other variations are within its scope. For example, some embodiments may utilize CDM magnets formed into a ring-shape. These embodiments may levitate a spherically shaped diamagnet just above a central hole. These embodiments may be desirable for use as motion sensors or accelerometers, where the spherical diamagnet acts as a fixed internal mass and the motion of the environment is sensed by the relative motion of the magnets and housing. Ring-shaped CDM magnets may also be desirable because they can be configured to automatically measure two-dimensional motions, as they are symmetric in two horizontal dimensions. Some embodiments using ring-shaped CDM magnets may also include a relatively small tilt so that the diamagnet sphere does not fall out of the trap.

Embodiments of the present disclosure may also be delivered as part of a service engagement with a client corporation, nonprofit organization, government entity, internal organizational structure, or the like, for example, to monitor infrastructure, such as buildings and bridges. Aspects of these embodiments may include deploying a first plurality of parallel dipole line sensor unit units onto an infrastructure object, wherein each of the first plurality of PDL sensor units may comprise a plurality of cylindrical diametric magnets mounted in parallel around a first open region; and a diamagnetic cylinder in the first open region. These embodiments may further comprise detecting a current position of each diamagnetic object relative to at least one of the plurality of cylindrical diametric magnets. Optionally, some of these embodiments may further include analyzing the infrastructure, creating recommendations responsive to the analysis, deploying data collection systems that implement portions of the recommendations, using the deployed data collection systems to collect data from the object over predefined periods of time, analyzing the data, and generating alerts based on the analysis.

GENERAL

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A rotational oscillation sensor comprising:
   a first plurality of parallel dipole line (PDL) sensor unit units, wherein each of the plurality of PDL sensor units comprises:
   a plurality of cylindrical diametric magnets (CDMs) mounted in parallel around a first open region; and
   a diamagnetic object in the first open region;
   wherein the first plurality of PDL sensor units cooperate to detect rotation around a first axis.

2. The rotational oscillation sensor of claim 1, wherein each of the first plurality of PDL sensor units comprises a light and a split photodetector that cooperate to determine a current position of the diamagnetic object.

3. The rotational oscillation sensor of claim 1, wherein each of the first plurality of PDL sensor units further comprises a pair of electrodes that bias the diamagnetic object toward a center position when energized by a voltage.

4. The rotational oscillation sensor of claim 3, further comprising a PID controller adapted to provide negative feedback to bias the first diamagnetic object toward the center position, wherein the PID controller is further adapted to produce an output proportional to a current position of the first diamagnetic object.

5. The rotational oscillation sensor of claim 1, wherein the first plurality of parallel dipole line (PDL) sensor unit units comprise three PDL sensor units arranged in a triangle.

6. The rotational oscillation sensor of claim 1, wherein the first plurality of parallel dipole line (PDL) sensor unit units comprise four PDL sensor units arranged in a square.

7. The rotational oscillation sensor of claim 1, wherein the first plurality of PDL sensor units are arranged in a first layer; and further comprising a second plurality of PDL sensor units arranged in a second layer.

8. The rotational oscillation sensor of claim 7, wherein the first plurality of PDL sensor units and the second plurality of PDL sensor units cooperate to detect rotation around three axis.

9. The rotational oscillation sensor of claim 7, wherein the first plurality of parallel dipole line (PDL) sensor units comprise three PDL sensor units arranged in a first triangle, and the second plurality of PDL sensor units comprise three PDL sensor units arranged in a second triangle.

10. The rotational oscillation sensor of claim 7, wherein the first plurality of parallel dipole line (PDL) sensor units comprise four PDL sensor units arranged in a first square, and the second plurality of PDL sensor units comprise four PDL sensor units arranged in a second square.

11. The rotational oscillation sensor of claim 1, wherein the first plurality of parallel dipole line (PDL) sensor units comprise four PDL sensor units arranged in a tetrahedron.

12. The rotational oscillation sensor of claim 1, wherein the first plurality of parallel dipole line (PDL) sensor unit units output a current velocity of the diamagnetic object relative to at least one of plurality of cylindrical diametric magnets.

13. The rotational oscillation sensor of claim 1, wherein the rotational sensor is sensitive to very low frequency vibrations lower than about 1 Hz.

14. The rotational oscillation sensor of claim 1, wherein the rotational oscillation sensor is sensitive to very low frequency vibrations lower than about 0.001 Hz.

15. A method of detecting rotational oscillation of an object, comprising:
   deploying a first plurality of parallel dipole line (PDL) sensor unit units onto an object,
   wherein each of the first plurality of PDL sensor units comprises:
   a plurality of cylindrical diametric magnets mounted in parallel around a first open region; and
   a diamagnetic cylinder in the first open region; and
   detecting a current position of each diamagnetic object relative to at least one of the plurality of cylindrical diametric magnets; and
   associating the detected current positions with a rotation of the object around a first axis.

16. The method of claim 15, further comprising calculating a current velocity of each diamagnetic object relative to at least one of the plurality of cylindrical diametric magnets using the detected current positions.

17. The method of claim 15, wherein the first plurality of PDL sensor units are arranged in a first layer; and further comprising attaching a second plurality of parallel dipole line (PDL) sensor unit units to the object.

18. The method of claim 17, wherein the first plurality of PDL sensor units are attached in the first layer and wherein the second plurality of PDL sensor units are attached in a second layer.

19. A rotational oscillation sensor unit, comprising:
   a metallic enclosure;
   a sensor module attached to the metallic enclosure, the sensor module comprising at least three parallel dipole line (PDL) sensor unit units, wherein each of PDL sensor units comprises:
   a plurality of cylindrical diametric magnets (CDMs) mounted in parallel around a first open region; and
   a diamagnetic object in the first open region; and
   an electronics module coupled to the sensor module, wherein the electronics module is adapted to detect a current position of each diamagnetic object relative to at least one of the CDMs and to calculate a rotation of an object from the detected current positions.

* * * * *